United States Patent
Lazarev et al.

(10) Patent No.: US 7,324,181 B2
(45) Date of Patent: Jan. 29, 2008

(54) NON-ABSORBING POLARIZATION COLOR FILTER AND LIQUID CRYSTAL DISPLAY INCORPORATING THE SAME

(75) Inventors: Pavel I. Lazarev, London (GB); Michael V. Paukshto, Foster City, CA (US); Louis D. Silverstein, Scottsdale, AZ (US); Pochi Yeh, Thousand Oaks, CA (US)

(73) Assignee: Nitto Denko Corporation, Osaka (JP)

( * ) Notice: Subject to any disclaimer, the term of this patent is extended or adjusted under 35 U.S.C. 154(b) by 342 days.

(21) Appl. No.: 11/102,196

(22) Filed: Apr. 7, 2005

(65) Prior Publication Data

US 2005/0231661 A1 Oct. 20, 2005

Related U.S. Application Data

(60) Provisional application No. 60/562,916, filed on Apr. 15, 2004.

(51) Int. Cl.
 *G02F 1/1335* (2006.01)
 *G02B 27/28* (2006.01)
(52) U.S. Cl. .................. 349/119; 349/115; 359/494
(58) Field of Classification Search ............. 349/115, 349/96, 119; 359/487, 489, 494, 502
 See application file for complete search history.

(56) References Cited

U.S. PATENT DOCUMENTS

| | | | |
|---|---|---|---|
| 6,174,394 B1 | 1/2001 | Gvon et al. | |
| 6,847,420 B2* | 1/2005 | Lazarev et al. | 349/96 |
| 6,943,858 B2* | 9/2005 | Lyu et al. | 349/119 |
| 7,079,208 B2* | 7/2006 | Kim et al. | 349/119 |
| 7,079,209 B2* | 7/2006 | Nakagawa | 349/119 |
| 2003/0164914 A1* | 9/2003 | Weber et al. | 349/115 |

OTHER PUBLICATIONS

Lazarev, P., et al., *Displays, Materials and Components,* Proceedings of the 7th International Workshop, Kobe Japan, Nov. 29, 2000, pp. 1159-1160.

* cited by examiner

*Primary Examiner*—Toan Ton
(74) *Attorney, Agent, or Firm*—Westerman, Hattori, Daniels & Adrian, L.L.P.

(57) ABSTRACT

The present invention relates to the field of color filters, in particular, to a non-absorbing polarization color filters and to high-brightness color liquid crystal display panel with improved image contrast employing non-absorbing polarization color filters and light recycling among neighboring subpixels. The disclosed invention represents a non-absorbing polarization color filter comprising the following elements: a rear broadband multilayer lossless polarizer, a front broadband multilayer lossless polarizer, and a color polarization rotator. The rear broadband multilayer lossless polarizer has a predefined-oriented transmission axis AB. Said front broadband multilayer lossless polarizer is located approximately in parallel with the rear broadband multilayer lossless polarizer, and has a transmission axis approximately parallel or approximately orthogonal with respect to transmission axis AB. The color polarization rotator is located between the front broadband multilayer lossless polarizer and the rear broadband multilayer lossless polarizer. Said color polarization rotator comprises a stack of thin birefringent films with c-axes orientations alternated in sign according to a rocking angle α with respect to orientation of the transmission axis AB. A number, a rocking angle α, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

22 Claims, 10 Drawing Sheets

NON-ABSORBING POLARIZATION COLOR FILTER AND LIQUID CRYSTAL DISPLAY INCORPORATING THE SAME

CROSS-REFERENCE TO RELATED APPLICATIONS

This application claims benefit under 35 U.S.C. § 119(e) to application Ser. No. 60/562,916, filed Apr. 15, 2004, the disclosure of which is incorporated herein by reference.

FIELD OF THE INVENTION

The present invention relates to the field of color filters, in particular, to non-absorbing polarization color filters and to high-brightness color liquid crystal display panel with improved image contrast employing non-absorbing polarization color filters and light recycling among neighboring subpixels.

BACKGROUND OF THE INVENTION

There is a great demand for flat liquid crystal display (LCD) panels capable of displaying video images with improved contrast. Examples of equipment requiring such display structures for direct viewing include notebook, laptop and other computers.

In general, prior art color LCD panels have essentially the same basic construction. Each LCD display panel comprises the following main components: a backlight structure for producing a plane of uniform lighting intensity; an electrically-addressable array of control elements producing modulation of the intensity of light; and an array of color filters located in the neighborhood of the array of modulating elements, producing spectral filtering of the modulated light in order to form a color image.

In color LCD panel design, the goal is to provide for a maximum percentage transmission of light from the backlight structure through the color filter array. However, using prior art design and technology, it was impossible to achieve this goal because of significant losses in light transmission caused by the following factors: losses of light energy due to absorption-type polarizers used in the LCD panels; absorption of light reflected from thin-film transistors (TFTs) and wiring of the pixelated spatial intensity modulation arrays used in the LCD panels; absorption of light by pigments used in the spectral filters of the LCD panels; and Fresnel losses due to mismatch of refractive indices between layers within the LCD panels. As a result of such factors, the light transmission efficiency of prior art color LCD panels is typically not greater than 5%. Consequently, up to 95% of the light produced by the backlight structure is converted into heat across the LCD panel. Thus, it is impossible to obtain high-brightness images using prior art color LCD panels in neither direct nor projection display systems without using ultra-high intensity backlight sources which require high supplied power and produce great amounts of heat necessitating adequate cooling measures and the like.

In response to the drawbacks of prior art color LCD panel designs, several alternative approaches have been proposed in order to improve the light transmission efficiency of the panel and thus increase the brightness of produced images.

For example, there is an LCD panel employing cholesteric liquid crystal (CLC) polarizers for replacing absorbing dye polarizers of prior art LCD panels and obtaining improved color purity. There is another LCD panel employing a scheme of partial light recycling in order to improve the brightness of the LCD panel. And there is one more LCD panel, which uses a holographic diffuser for extracting light out from a light guiding panel of the backlight structure and CLC polarizers for the local recycling of light diffuse scattered by the holographic diffuser in order to improve the brightness of the LCD panel.

However, such prior art color LCD panels are still not free of shortcomings and drawbacks. In particular, despite the use of non-absorbing CLC polarizers and localized light recycling principles, prior art LCD panels continue to require at least one light absorbing layer along the optical path extending from the backlight structure to the viewer. Consequently, prior art LCD panels have very low light transmission efficiencies. Thus, the formation of high-brightness color images using prior art LCD panels required high-intensity backlight sources which consume very high electric power, produce large amounts of heat, and necessitate the use of fans and other cooling measures to maintain the temperature of both the LCD panel and the lamp(s) in the backlight structure within safe operating limits.

Thus, there is a great need for an non-absorbing color filter and an improved color LCD panel capable of producing high brightness color images without shortcomings and drawbacks of the prior art LCD panel devices.

SUMMARY OF THE INVENTION

The disclosed invention represents a non-absorbing polarization color filter comprising the following elements: a rear broadband multilayer lossless polarizer, a front broadband multilayer lossless polarizer, and a color polarization rotator. The rear broadband multilayer lossless polarizer has a predefined-oriented transmission axis AB. The front broadband multilayer lossless polarizer has a front surface and a rear surface facing the rear broadband multilayer lossless polarizer. Said front broadband multilayer lossless polarizer is located approximately in parallel with the rear broadband multilayer lossless polarizer, and has a transmission axis approximately parallel or approximately orthogonal with respect to transmission axis AB. The color polarization rotator is located between the front broadband multilayer lossless polarizer and the rear broadband multilayer lossless polarizer approximately in parallel with said polarizers. Said color polarization rotator comprises a stack of thin birefringent films with c-axes orientations alternated in sign according to a rocking angle α with respect to orientation of the transmission axis AB. A number, a rocking angle α, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

The present invention further provides a liquid crystal display, comprising a liquid crystal cell, and said non-absorbing polarization color filter.

BRIEF DESCRIPTION OF THE DRAWINGS

A more complete assessment of the present invention and its numerous advantages will be readily achieved as the same becomes better understood by reference to the following detailed description, considered in connection with the accompanying drawings and detailed specification, all of which forms a part of the disclosure.

DETAILED DESCRIPTION OF THE INVENTION

Having generally described the present invention, a further understanding can be obtained by reference to the specific preferred embodiments, which are provided herein for purposes of illustration only and are not intended to limit the scope of the appended claims.

Figure 1:
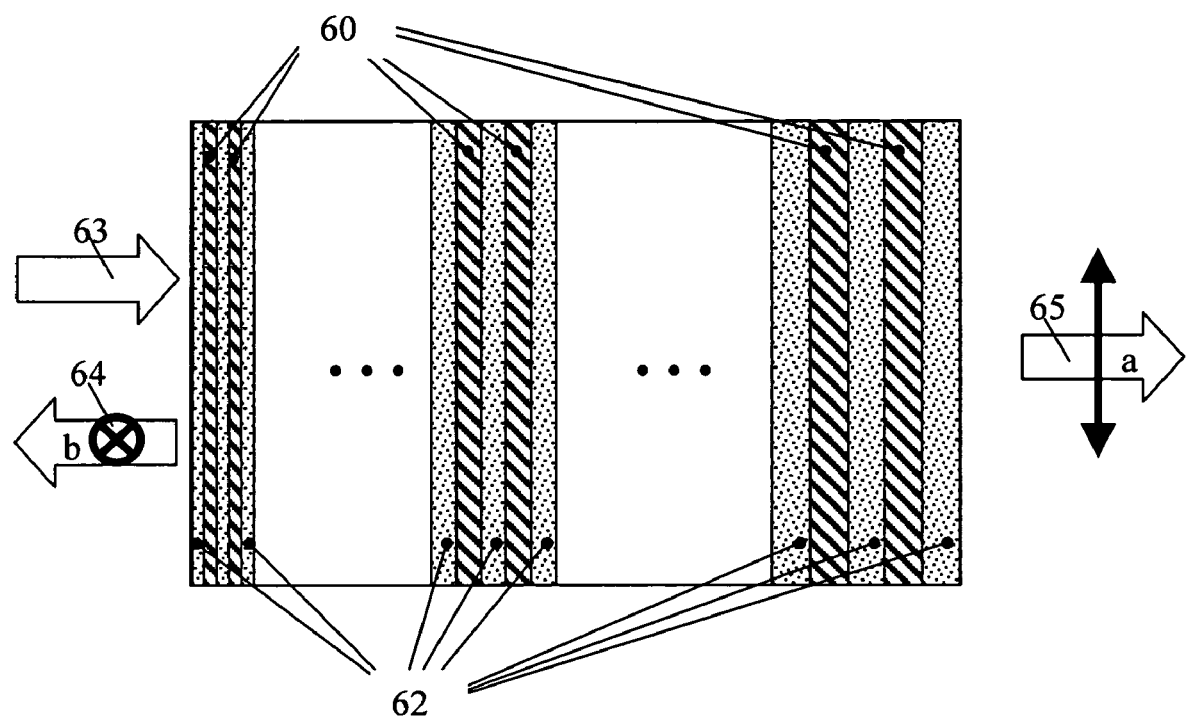
FIG. 1 shows the diagram of the first variant of broadband multilayer lossless polarizer according to the present invention.

In FIG. 1, a subcomponent structure of the broadband multilayer lossless polarizer is shown for greater clarity. The polarizer comprises a stack of alternating layers of birefringent films 60 and isotropic films 62. Said polarizer has a transmission axis AB. If the unpolarized light 63 incidents onto the broadband multilayer lossless polarizer, one part of a: light 64 having the polarization approximately orthogonally with respect to said transmission axis AB (polarization state of b-type) is reflected from the broadband multilayer lossless polarizer, at the same time other part of a light 65 having the polarization approximately in parallel with respect to said transmission axis AB (polarization state of a-type) is transmitted through the broadband multilayer lossless polarizer.

The backlight structure produces unpolarized light composed of spectral components having both a-type and b-type polarization states. The broadband multilayer lossless polarizer is multilayer structures of stacked layers, which reflect light consisting of spectral components having wavelengths at least within said visible band and said polarization state of b-type, and transmit polarized light consisting of spectral components having wavelengths at least within said visible band and said polarization state of a-type.

The broadband multilayer lossless polarizers can be of three types: the reflective polarizers, interferential polarizers and polarizers of a mixed type—reflective-interferential polarizers. The thicknesses of stacked layers can be as both thick and thin. The thickness of thick layer may exceed several wavelengths. The thickness of thin layer may approximately equal to a quarter of a wavelength. Thickness of adjoining layers in the stack can be approximately equal to a quarter of a wavelength of the incident light. Other variant of the broadband multilayer lossless polarizer is possible, in which thick and thin layers are alternated.

At least one layer of the multilayer structure is optically anisotropic, and is made by means of Cascade Crystallization Process.

Figure 2:
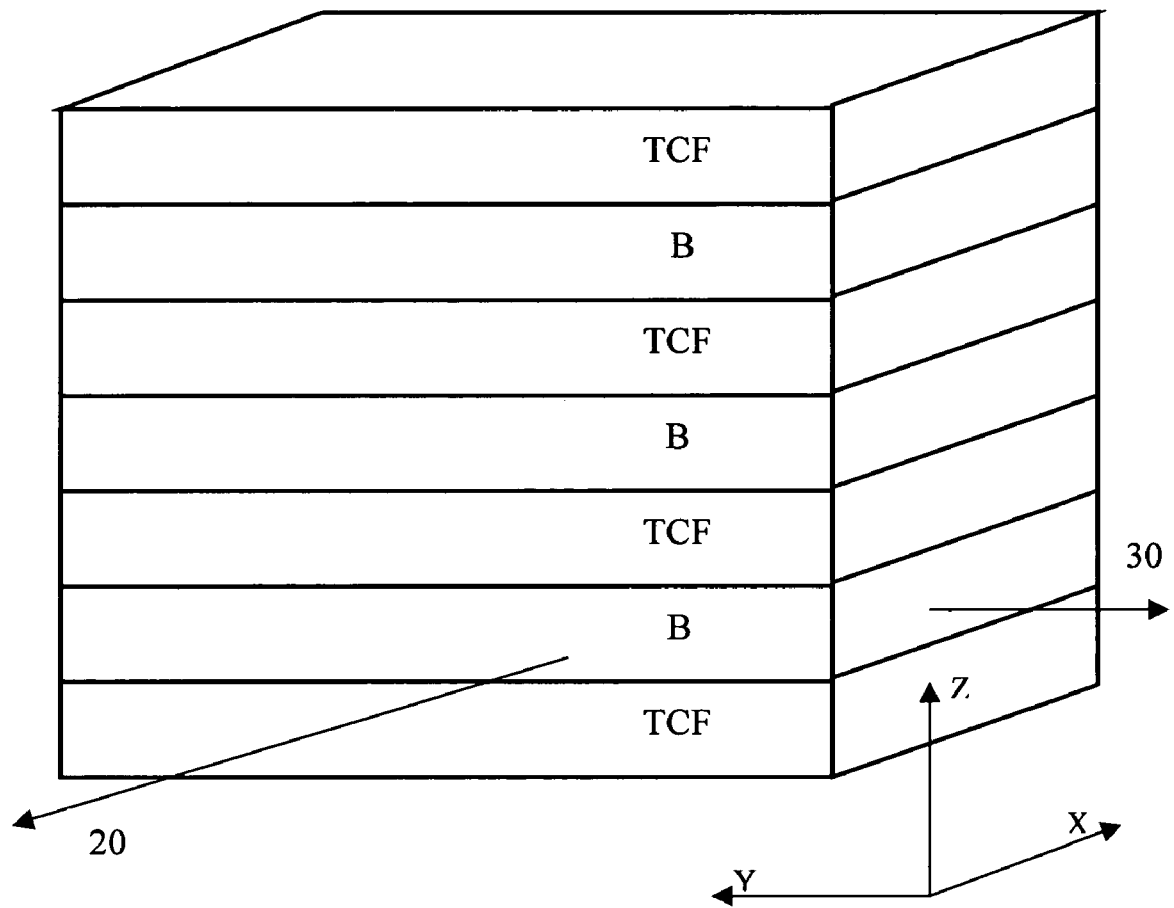
FIG. 2 shows the cross section of a multilayer structure comprising a stack of layers.

FIG. 2 is a schematic diagram of the cross section of one of the multilayer structure of stacked layers. This figure shows a coordinate system that defines X, Y and Z directions. The illustrated multilayer structure comprises alternating layers of two different organic materials referred to as anisotropic layer (also called as thin crystal film, TCF) and isotropic layer B throughout the drawings and description. Anisotropic TCF can be obtained by the method called Cascade Crystallization Process developed by Optiva, Inc. [P. Lazarev and M. Paukshto, *Proceedings of the 7th International Workshop "Displays, Materials and Components"* (Kobe, Japan, Nov. 29-Dec. 1, 2000), pp. 1159-1160]. According to this method, an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal layer which is also called thin crystal film or TCF, is formed in the course of subsequent alignment of supramolecules and removal of the solvent.

A method stipulated for the synthesis of anisotropic thin crystal films from a colloidal system with supramolecules includes the following stages:

(i) application of the aforementioned colloidal system onto a substrate (or onto a device or a layer in a multilayer structure); the colloidal system must possess thixotropic properties, which are provided by maintaining a preset temperature and a certain concentration of the dispersed phase;

(ii) conversion of the applied colloidal system into a high flow (reduced viscosity) state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(iii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iv) conversion of the aligned region of the layer from the state of reduced viscosity, achieved due to the external action, into the state of the initial or higher viscosity; this transition is performed so as not to cause disorientation of the anisotropic thin crystal film structure and not to produce surface defects;

(v) final stage of solvent removal (drying), in the course of which the final anisotropic thin crystal film structure is formed.

In the resulting anisotropic layer, the molecular planes are parallel to each other and the molecules form a three-dimensional crystal structure, at least in a part of the layer. Optimization of the production technology may allow the formation of a single-crystal film.

The anisotropic layer thickness usually does not exceed 1 μm. The layer thickness can be controlled by changing the content of a solid substance in the applied solution and/or by varying the applied layer thickness. In order to obtain the layers possessing desired optical characteristics, it is possible to use mixed colloidal systems (such mixtures can form joint supramolecules).

The mixing of said organic compounds in solution results in the formation of mixed aggregates of variable composition. The analysis of X-ray diffraction patterns of dye mixtures allows us to judge about the molecular packing in supramolecules by the presence of a characteristic diffraction peak corresponding to intermolecular distances in the range from 3.1 to 3.7 Å. In the general case, this value is common for aromatic compounds in the form of crystals and aggregates. The peak intensity and sharpness increase in the course of drying, but the peak position remains unchanged. This diffraction peak corresponds to the intermolecular spacing within aggregates (stacks) and has been observed in the X-ray diffraction patterns of various materials. The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional biaxial crystal structure. The chemical compounds that can be used for this purpose are not limited to those listed above.

The anisotropic layers possess a high degree of optical anisotropy as well. Such layers exhibit the properties of E-type polarizers, which are related to peculiarities of the optical absorption of supramolecular complexes, and behave as retarders (phase-shifting films) in the spectral ranges where the absorption is insignificant. The retardation properties of these anisotropic layers are related to their birefringence (double refraction) that is, to a difference in refractive indices measured in the direction of application of the LLC solution onto a substrate and in the perpendicular direction. Layers formed from the LLC systems based on strong (light-fast) dye molecules are characterized by high thermal stability and radiation resistance. They remain stable in a temperature range of approximately 350-700° C.

An important advantage of application of Cascade Crystallization Process implemented in the disclosed non-absorbing polarization color filter and LCD consists in the possibility of using printing technology for the creation of functional elements of said filter and LCD.

Thus, optically anisotropic A-layers are obtained by means of Cascade Crystallization Process. Such layers are characterized by a globally ordered biaxial crystalline structure with an intermolecular spacing of 3.4±0.3 Å in the direction of one of the optical axes. Each A-layer is characterized by at least two indexes of refraction: $n_x$ and $n_y$. These layers have a fundamental absorption edge below 400 nm, are uniformly transparent in the wavelength band of visible light, and have a transmission coefficient of not less than 0.98. Each A-layer is formed by rodlike supramolecules, which represent at least one polycyclic organic compound with a conjugated π-system and ionogenic groups.

The X-axis is referred to as the "alignment" direction and defines so-called "alignment" axis (20) shown in FIG. 2 while the Y-axis is referred to as the "transverse" direction and defines so-called "transmission" axis (30) shown in FIG. 2.

Layers B are isotropic layers and have a nominal index of refraction (for example, n=1.64), which is not substantially altered by Cascade Crystallization Process.

Cascade Crystallization Process alters the index of refraction of TCF. For example, TCF have one index of refraction (for example, n=1.88) associated with the alignment direction and a different index of refraction (for example, n=1.64) associated with the transverse direction. By definition, the index of refraction associated with an in-plane axis (an axis parallel to the surface of the film) is called the "effective" index of refraction for the plane-polarized incident light whose plane of polarization is parallel to this axis.

Thus, the multilayer stack (TCF-B-TCF-B-TCF . . . ) shows a large difference of refractive indices between layers (Δn=1.88−1.64=0.24) associated with the alignment direction. In the transverse direction, the indices of refraction of various layers are essentially the same (Δn=1.64−1.64=0). These optical characteristics cause the multiple structures to transmit the polarization component of the incident light that is correctly oriented with respect to the "transmission" axis shown in FIG. 2.

Figure 3:
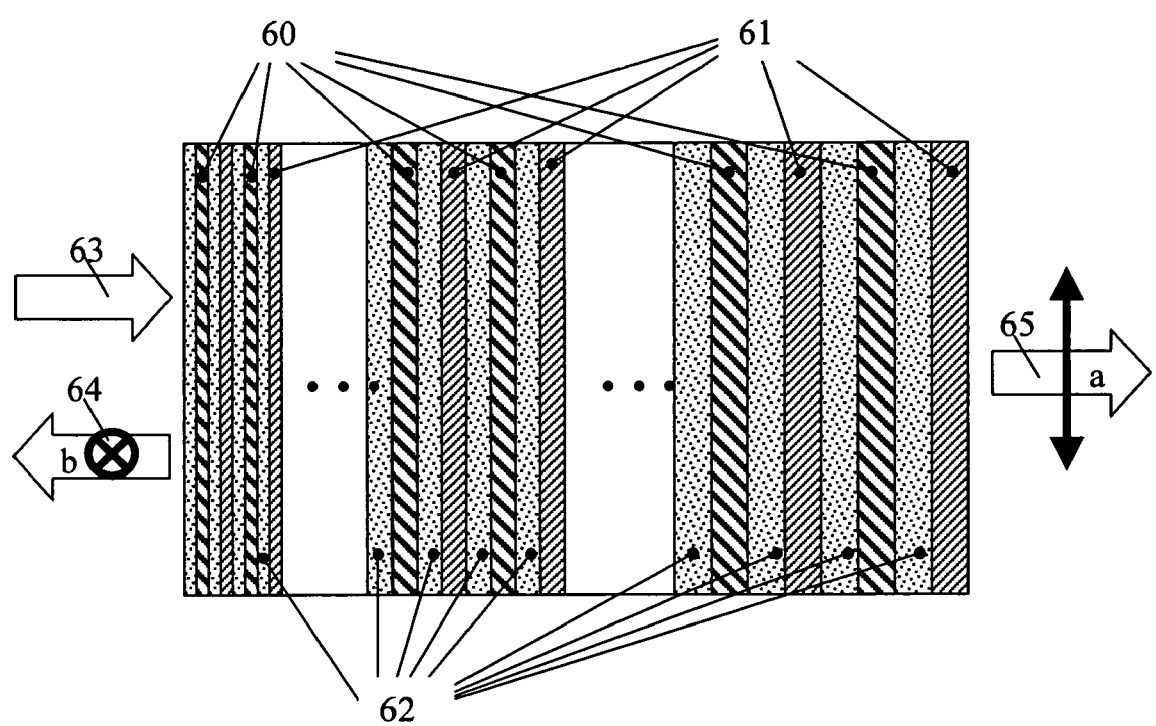
FIG. 3 shows the diagram of the second variant of broadband multilayer lossless polarizer according to the present invention.

In FIG. 3, another variant of the broadband multilayer lossless polarizer is shown for greater clarity. The polarizer comprises a quarter-wave stack of alternating layers of birefringent films (60 and 61) and isotropic films 62. It is necessary to use the films with large birefringence with matching indices. The two different birefringent films with different indices are used in this variant of polarizer to improve efficiency at all viewing angles. If the unpolarized light 63 incidents onto the broadband multilayer lossless polarizer, one part of a light 64 having the characteristic polarization state of b-type is reflected from the broadband multilayer lossless polarizer, at the same time other part of a light 65 having the characteristic polarization state of a-type is transmitted through the broadband multilayer lossless polarizer. At least one birefringent film of the multilayer structure is made by means of Cascade Crystallization Process.

Figure 4:
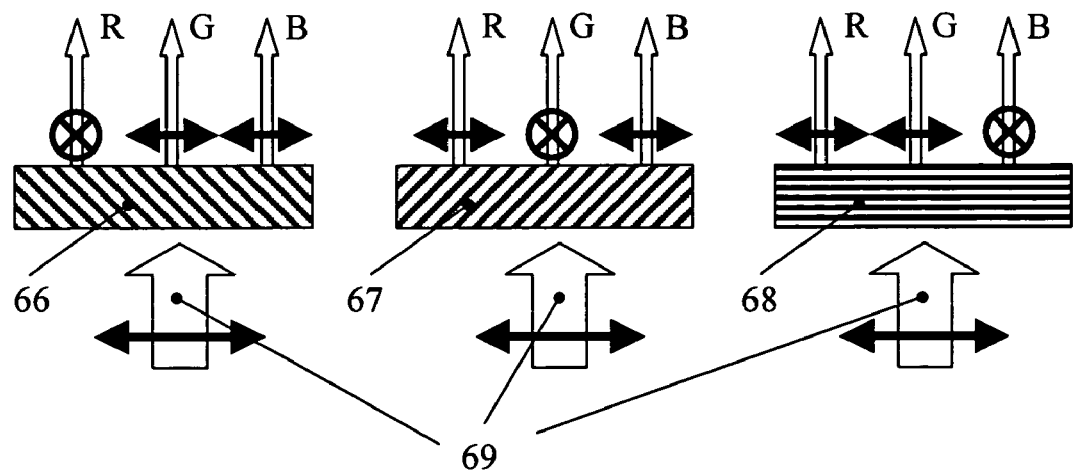
FIG. 4 shows the functioning of color polarization rotators as elements of "red", "green" and "blue" subpixels.

FIG. 4 demonstrates a principle of functioning of color polarization rotators (CPR) as elements of "red", "green" and "blue" subpixels. Only the polarization state of one color (e.g., Red, Green, or Blue) is rotated by 90 degrees in each subpixel. The polarization states of the other two color components remain unchanged. For incident light 69 having linear polarization state of a-type, the color polarization rotator of "red" subpixel 66 rotates by 90 degrees the polarization state of "red" light (polarization state of b-type), whereas the rotator leaves invariable polarization states of "green" and "blue" components of light (polarization state of a-type). In "green" subpixel, the color polarization rotator 67 rotates by 90 degrees the polarization state of "green" components of light and does not changes polarization states of "red" and "blue" components of light. In "blue" subpixel, the color polarization rotator 68 rotates by 90 degrees the polarization state of "blue" components of light and does not change polarization states of "red" and "green" components of light.

Figure 5:
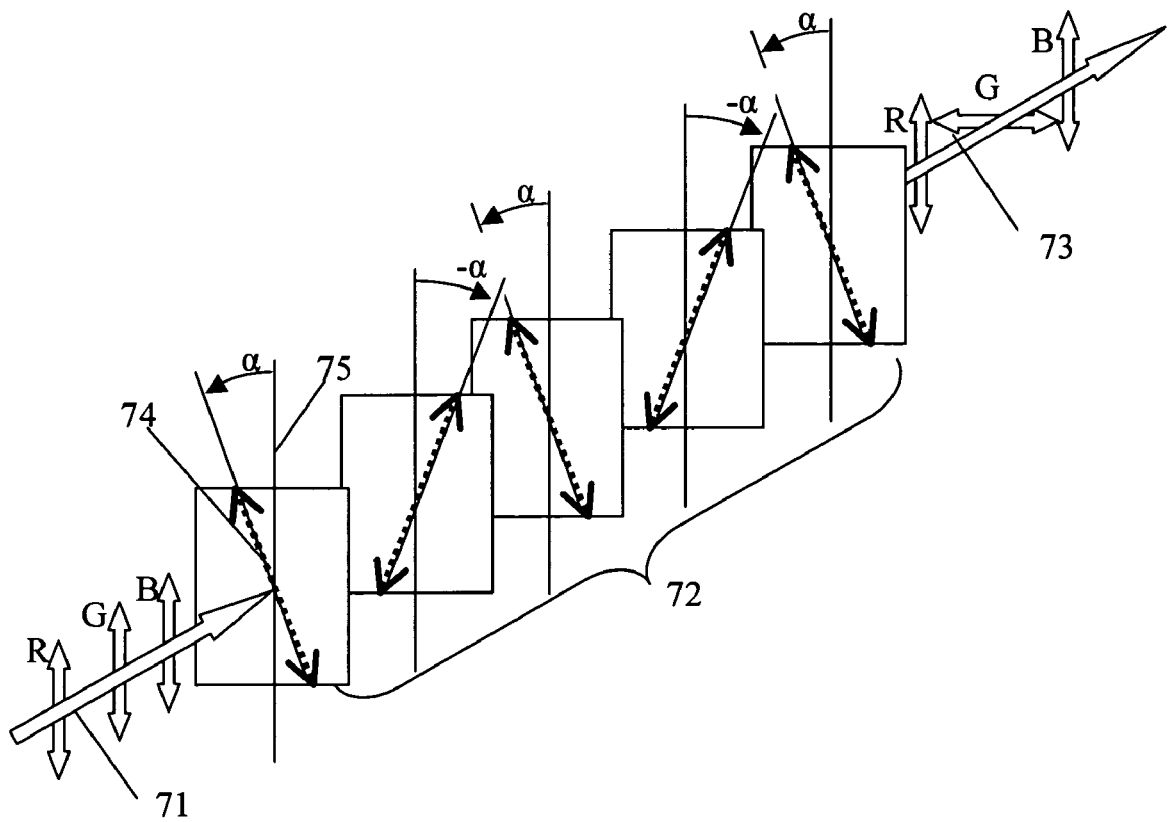
FIG. 5 shows the inner structure of "green" color polarization rotator.

FIG. 5 schematically shows the design of "green" CPR. The CPR comprises a stack 72 of thin birefringent films operated as retarders with rocking orientations of optic c-axes 74. The optic axis of these retarders differs from the one adjacent to it by exactly ±α. If the first retarder is at +α to a reference axis 75 then the next retarder will be at −α to it and the third retarder will be back at +α and so on as shown in FIG. 5. If the number of such retarders in the stack is equal N, the effect of N such retarders is to rotate the polarization vector by 2αN. If the polarization vector rotates onto angle pi/2, then the following equality has to be satisfied: 2αN=pi/2. The angle α for each retarder in the stack of said N number of retarders is equal to pi/(4N). Notice that as the number of retarders in the stack is reduced the spectral bandwidth increases. Therefore if such a CPR is to be used in a color generation system requiring saturated colors the number of birefringent retarders in the system will have a significant part. However if brightness is preferred over chromaticity then the number of retarders can be reduced allowing the user to adjust the characteristics for their specific requirement. The maximum transmission is achieved, when the film thickness are equal to $\lambda/(2\Delta n)$, where $\lambda$ is equal to wavelength rotated and $\Delta n = n_e - n_o$. The FIG. 5 shows the incident light 71 having the spectral components (Red, Green, and Blue) polarized in a direction of the reference axis 75. In this case the polarization state of green component of output light 73 is rotated by 90 degrees. The similar reasoning is fair for other light components (for Red and Blue). The stacked films may be obtained by means of Cascade Crystallization Process. In this case the c-axis coincides with alignment direction.

Figure 6:
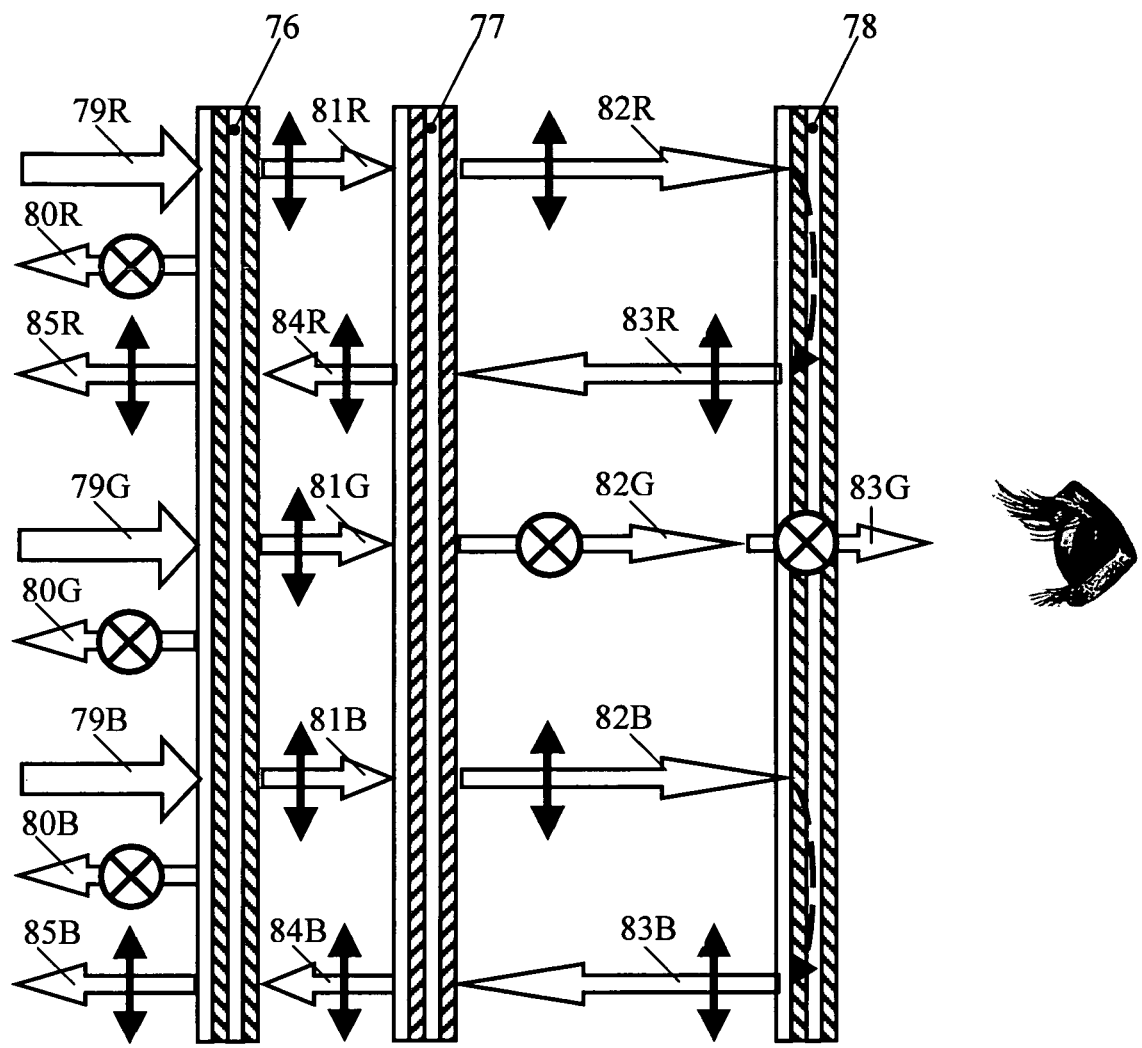
FIG. 6 is a schematic diagram of a non-absorbing polarization "green" color filter.

A "green" non-absorbing polarization color filter is schematically figured in FIG. 6. The non-absorbing polarization color filter comprises the Color Polarization Rotator (CPR) 77 located between a rear broadband multilayer lossless polarizer 76 and a front broadband multilayer lossless polarizer 78. In one embodiment of present invention shown in FIG. 6 the rear broadband multilayer lossless polarizer and front broadband multilayer lossless polarizer are crossed polarizers and transmission axis of rear broadband multilayer lossless polarizer is parallel to reference axis of the CPR. The following terms will be used in a further description. The polarization state of light having the electrical vector parallel with respect to transmission axis of rear broadband multilayer lossless polarizer is named as polarization state of a-type. On the other hand the polarization state of light having the perpendicular electrical vector with respect to transmission axis of rear broadband multilayer lossless polarizer is named as polarization state of b-type.

For incident unpolarized light 79R with spectral components having the wavelengths within the "red" band a part of the light having the polarization state of b-type 80R is reflected from the rear broadband multilayer lossless polarizer on the other hand an another part of the light having the polarization state of a-type 81R is transmitted through the rear broadband multilayer lossless polarizer. Then, the transmitted part of the light is transmitted through the CPR without changing the polarization state 82R and reflected from the front broadband multilayer lossless polarizer with the same polarization state 83R. Whereupon the light is retransmitted through the CPR without changing the polarization state 84R and retransmitted through the rear broadband multilayer lossless polarizer with the same polarization state 85R. Thus, incident unpolarized "red" light is reflected from the "green" non-absorbing polarization color filter practically without losses.

The similar reasoning is fair for incident unpolarized light with spectral components having the wavelengths within the "blue" band 79B. A part of this light having the polarization state of b-type 80B is reflected from the rear broadband multilayer lossless polarizer and another part of the light having the polarization state of a-type 81B is transmitted through the rear broadband multilayer lossless polarizer. Then, the transmitted part of the light is transmitted through the CPR without changing the polarization state 82B and reflected from the front broadband multilayer lossless polarizer with the same polarization state 83B. Whereupon the light is retransmitted through the CPR without changing the polarization state 84B and retransmitted through the rear broadband multilayer lossless polarizer with the same polarization state 85B. Thus similarly to previous case, incident unpolarized "blue" light is reflected from the "green" non-absorbing polarization color filter practically without losses.

In contrast to previous cases a part of incident unpolarized light with spectral components having the wavelengths within the "green" band is transmitted through the non-absorbing polarization color filter. The part of "green" light having the polarization state of b-type 80G is reflected from the rear broadband multilayer lossless polarizer and another part of "green" light having the polarization state of a-type 81G is transmitted through the rear broadband multilayer lossless polarizer. Whereupon transmitted spectral components 81G are transmitted through the CPR changing the polarization state from a-type to b-type 82G. At last said spectral components having the polarization state of b-type are transmitted through the front broadband multilayer lossless polarizer (see arrow 83G). Thus the part of unpolarized "green" light having the polarization state of a-type is transmitted by the non-absorbing polarization color filter changing the polarization state from a-type to b-type on the other hand an another part of the light having the polarization state of b-type is reflected from the non-absorbing polarization color filter. Thus, the non-absorbing polarization color filter is a pass-band filter, which rotates the polarization state of one color (e.g., GREEN) only, by 90 degrees. The polarization states of other colors (Blue and Red) remain the same.

In one embodiment of present invention the non-absorbing polarization filters are made of colorless birefringent crystal films only. Therefore the rear broadband multilayer lossless polarizer, front broadband multilayer lossless polarizer and CPR transmit or reflect the spectral components of light without energy loss or absorption.

Thus the non-absorbing polarization color filter is multilayer structure comprising two broadband multilayer lossless polarizers and color polarization rotator. A number, a rocking angle α, thicknesses and optical anisotropies of thin birefringent films of CPR are selected so, that the non-absorbing polarization color filter transmits a predetermined color light having the polarization state approximately parallel to transmission axis of rear broadband multilayer lossless polarizer AB, reflects said predetermined color light having the polarization state orthogonal to the transmission axis AB, and reflects an unpolarized light of other predetermined color.

Figure 7:
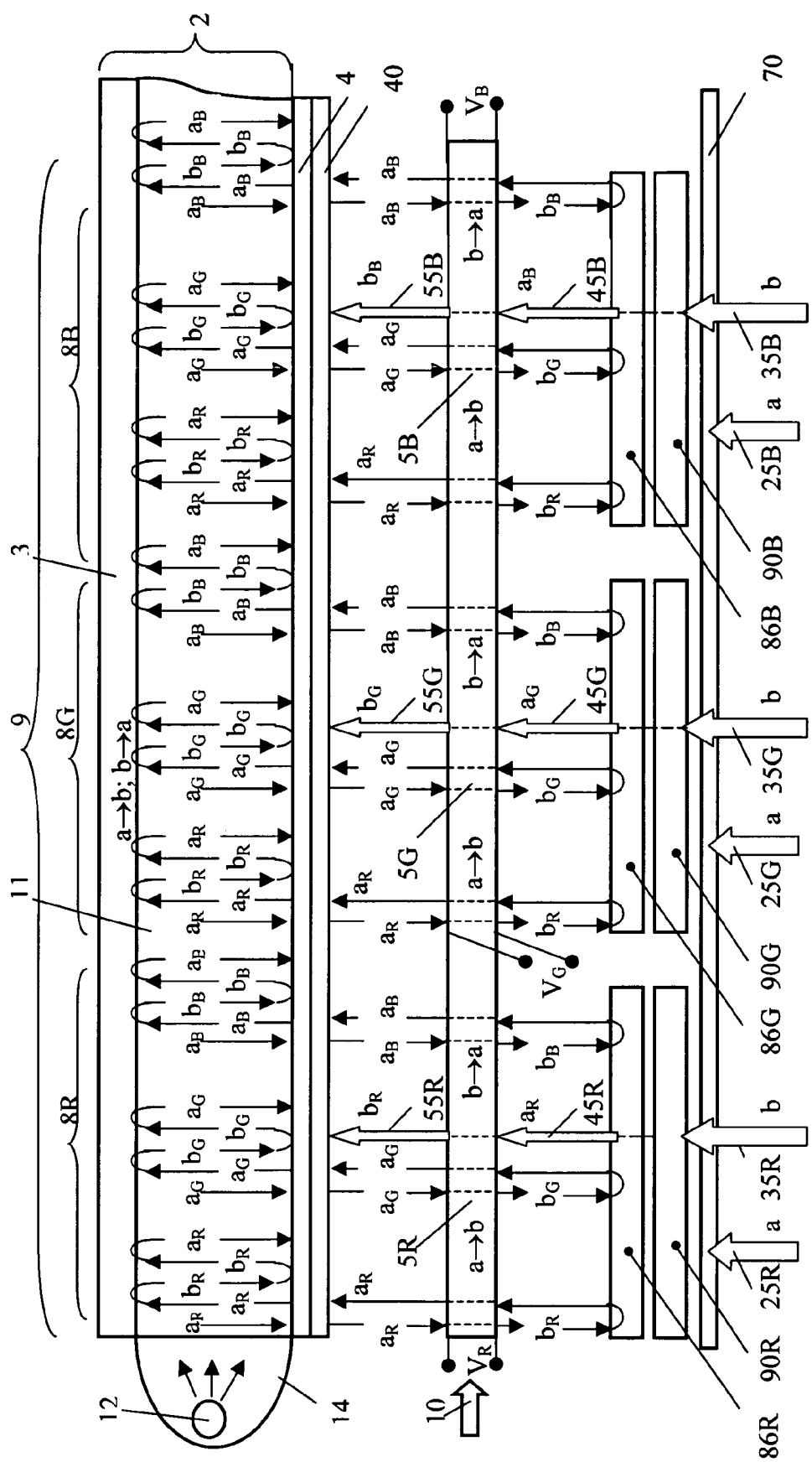
FIG. 7 is a schematic diagram of an expanded cross-sectional view of an exemplary pixel structure within the first particular embodiment of the LCD panel, wherein the spatial intensity modulation elements of the LCD panel are realized using linear polarization rotating elements, and the pixel driver signals provided thereto are selected to produce "dark" output levels at each of the RGB (red, green, blue) subpixels of the exemplary pixel structure.
Figure 8:
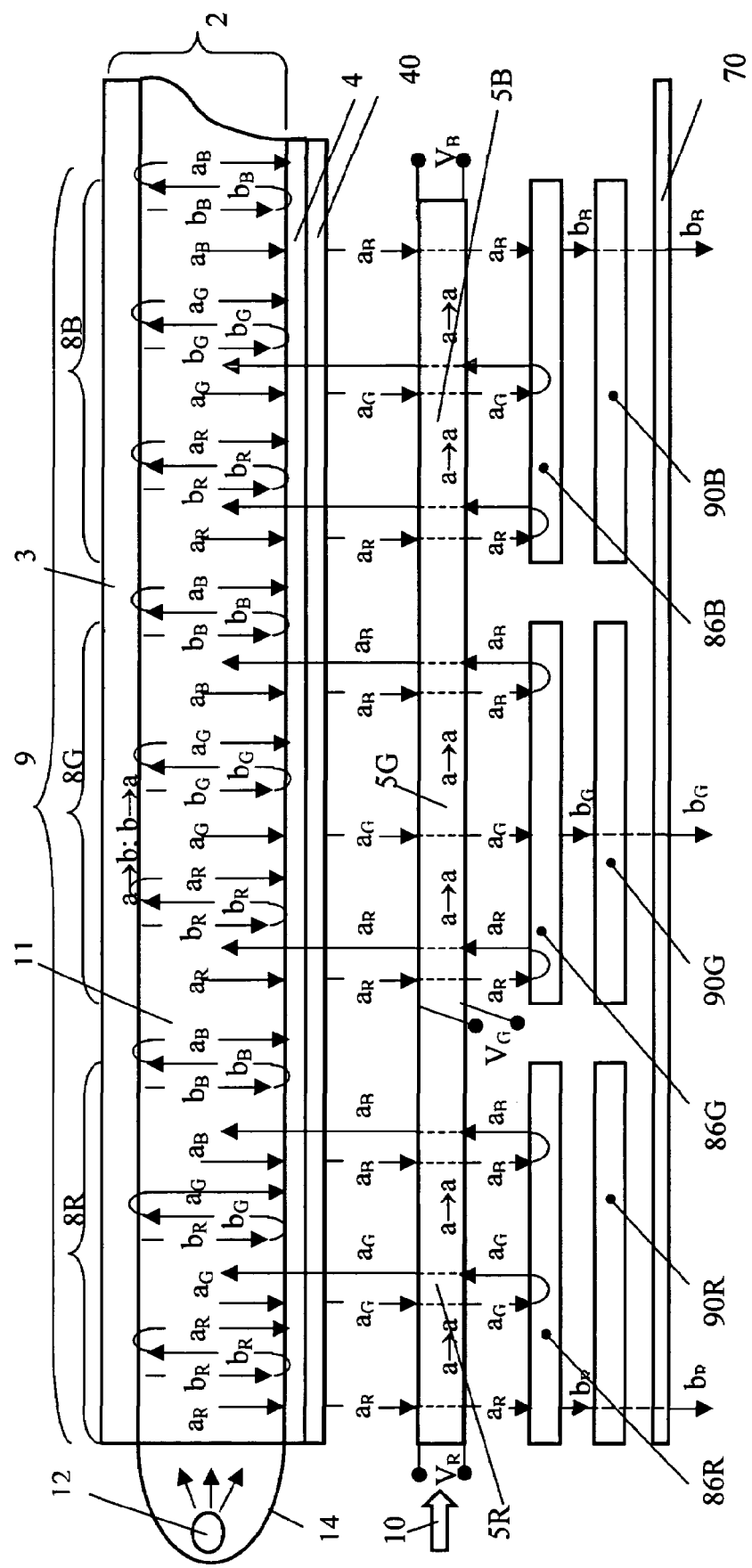
FIG. 8 is a schematic diagram of an expanded cross-sectional view of an exemplary pixel structure within the first particular embodiment of the LCD panel, wherein the spatial intensity modulation elements of the LCD panel are realized using linear polarization rotating elements, and the pixel driver signals provided thereto are selected to produce "bright" output levels at each of the RGB subpixels of the exemplary pixel structure.

In the illustrative embodiment of this LCD panel construction shown in FIGS. 7 and 8, linear polarization techniques are used to carry out the spatial intensity modulation and spectral filtering functions employed therein.

In the embodiments shown in FIGS. 7 and 8, the backlight structure 2 comprises a quasi-diffusive reflector 3, a light guiding panel 11, an edge-illuminating light sources 12, and a focusing mirrors 14, respectively, for coupling the light fluxes produced by sources 12 into the edges of light guiding panel 11. Preferably, the light guiding panel 11 is made of an optically transparent material; pair of miniature fluorescent tubes emitting unpolarized light serves as light sources 12.

During backlight operation, the light flux produced by sources 12 is coupled with the aid of focusing mirrors 14 into the edges of the light guiding panel 11, in which the light exhibits total internal reflection in a conventional manner. In this embodiment, the front surface of the light guiding panel 11 bears very fine pits in order to break the conditions of total internal reflection at the interface and allow the light to leak out in the direction of the pixelated array of polarization rotating elements. There are many alternative techniques for producing a plane of unpolarized light, which can also be used in the construction of any particular embodiment of the LCD panel according to the present invention.

For purposes of illustration only, the spectral filtering function realized within LCD panel of the first embodiments is based on the RGB (red, green, blue) additive primary color system. Alternatively, however, the spectral filtering function within LCD panel may be based on the CMY (cyan, magenta, yellow) subtractive primary color system.

In the first illustrative embodiment of the LCD panel, the emission spectrum of the light source within the backlight panel is assumed to be "white", and the spectral filtering function of the LCD panel is based on the RGB (red, green, blue) color system. Thus, each of the non-absorbing polarization color filters 86R, 86G, and 86B is designed to have pass-band characteristics such that all of the spectral content of the "red", "green" and "blue" bands of the light source, respectively, is used to produce color images for display. In this embodiment, each non-absorbing polarization color filter 86R, 86G and 86B is realized as a "pass-band" interference color filter.

In the first embodiment shown in FIGS. 7 and 8, the broadband rear multilayer lossless polarizer 4 transmits light having polarization state of a-type, reflects light having polarization state of b-type and serves as a polarization reference. Similarly, a front broadband sheet polarizer 70 transmits light having polarization state of b-type, absorbs light having polarization state of a-type.

In the first illustrative embodiment shown in FIGS. 7 and 8, the array of polarization direction rotating elements 5R, 5G, and 5B is realized as an array of electronically-controlled elements rotating the electric field linearly polarized according to a-type to the polarization state of b-type, and vice versa, as the light is transmitted through the corresponding pixels in the LCD panel. Each of the said polarization direction rotating elements is a part (area) of a continuous liquid crystal layer. In the first illustrative embodiment shown in FIGS. 7 and 8, each electronically-controlled linear polarization direction rotating element can be realized as a part of twisted nematic (TN) liquid crystal layer with twist angle equal to 90°, whose operation is controlled by applied voltage (by pixel drivers 10) as is well known in the art. In a further such electrically controlled part of a liquid crystal layer will be named as polarization direction rotating element. In the construction of the linear polarization direction rotating elements, thin film transistors (TFTS) can be used to create a voltage drop across a layer of liquid crystal material necessary to achieve alignment of the liquid crystal molecules and thus cause the corresponding element not to rotate the polarization direction of transmitted light. In the electrically inactive state (i.e., for zero applied voltage), the electric field intensity of the light at the cell output is substantially zero and thus a "dark" subpixel level is produced (see FIG. 7). In the electrically active state (i.e., when a threshold voltage VT is applied), the electric field intensity of light at the cell output is substantially nonzero and thus a "bright" subpixel level is produced (see FIG. 8).

In the first illustrative embodiment shown in FIGS. 7 and 8 the pixelated array of non-absorbing polarization color filters 86R, 86G, and 86B is realized as an array of pass-band linearly polarizing elements formed within a single plane. Front broadband sheet polarizer 70 is laminated on the pixelated array of non-absorbing polarization color filters and the pixelated array of usual (conventional) absorptive filters 90R, 90G, and 90B. The front broadband sheet polarizer 70 transmits the light having the polarization state of b-type and absorbs the light having the polarization state of a-type in a broad wavelength band.

The light transmission efficiency of prior art LCD panels exhibited degradation as a result of light absorption by pigments used in the spectral filters of the LCD panels. Because of considerable light energy losses, it was virtually impossible to increase the light transmission efficiency of prior art LCD panels above ~5%.

The LCD panel according to the present invention is free of the above drawbacks because it employs a light-recycling scheme. This scheme is implemented in the disclosed LCD panel in order to avoid high energy losses associated with prior art LCD panel design, and thereby more fully utilize the light energy produced by the backlight structure. While the details of this light-recycling scheme will be hereinafter described for each of the illustrative embodiments, it will be expedient in this context to briefly outline the general principles of light recycling.

In all embodiments of the present invention, a single polarization state of light is transmitted from the backlight structure to those structures (or subpanels) of the LCD panel where spatial intensity modulation and spectral filtering of the transmitted polarized light occurs in subpixels. At each subpixel location, the light within spectral bands which are not transmitted to the display surface during spectral filtering is reflected without absorption back toward the backlight structure, where the polarized light is recycled with light energy being gained therewith and then retransmitted from the backlight structure to that section of the LCD panel where spatial intensity modulation and spectral filtering of the retransmitted polarized light occurs in subpixels. This light-recycling scheme is schematically illustrated in FIGS. 7 and 8, and will be described in greater detail hereinafter. By virtue of this light-recycling scheme of the present invention, it is now possible to design LCD panels capable of utilizing with a high efficiency the light produced by backlight sources, in marked contrast with prior art LCD panels having maximum efficiencies of about 5%.

As is shown in FIGS. 7 and 8, unpolarized light produced within the backlight structure is composed of spectral components having both a-type and b-type polarization states. Only spectral components in polarization state of a-type are transmitted through the rear broadband multilayer lossless polarizer 4 adjacent to the backlight panel 2, whereas spectral components in polarization state of b-type incident thereon are reflected without energy loss or absorption. Spectral components reflected from rear broadband multilayer lossless polarizer 4 are incident onto the quasi-diffusive reflector 3 and undergo polarization inversion (from a-type to b-type and vice versa). This reflection process is independent of the wavelength. The spectral components having the polarization inverted from b-type to a-type are now transmitted through the rear broadband multilayer lossless polarizer 4. Then, the light transmitted the rear broadband multilayer lossless polarizer then incidents onto rear broadband sheet polarizer 40, where the light consisting of spectral components having wavelengths within visible band and polarization state of b-type is absorbed and the light consisting of spectral components having wavelengths within said visible band and said polarization state of a-type is transmitted.

When the linear polarization direction rotating elements 5R, 5G, and 5B associated with "red", "green", and "blue" subpixels (8R, 8G and 8B) are driven into inactive state as shown in FIG. 7, the spectral components of transmitted light are modified due to the orthogonal conversion of polarization state (from a-type to b-type and vice versa) and a "dark" subpixel level is produced in response to the inactive state into which the given element was driven.

When "red" subpixel 8R is driven into its "dark" state shown in FIG. 7, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5R changing the polarization state from a-type to b-type. Then, the converted spectral components having polarization state of b-type reflected from the non-absorbing polarization color filter 86R. The reflected "red", "green", and "blue" spectral components ($\Delta\lambda_R$, $\Delta\lambda_G$ and $\Delta\lambda_B$) having polarization state of b-type are retransmitted through the polarization direction rotating element 5R changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of a-type (see arrow 25R in FIG. 7) is absorbed by front broadband sheet polarizer 70. On the other hand the ambient "white" light having polarization state of b-type (see arrow 35R in FIG. 7) is transmitted by front broadband sheet polarizer 70. Then, the part of light having the "red" spectral components is transmitted through the absorptive color filter 90R, whereas the part of light having the "green" or "blue" spectral components is absorbed by said color filter. Then the light having the "red" spectral components is transmitted through the non-absorbing polarization color filter 86R changing the polarization state from b-type to a-type. Whereupon the "red" spectral components (see arrow 45R) are transmitted through the polarization direction rotating element 5R changing the polarization state from a-type to b-type. Then, the rear broadband sheet polarizer 40 absorbs the converted <<(red)>> spectral components (see arrow 55R).

When "green" subpixel 8G is driven into its "dark" state shown in FIG. 7, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5G changing the polarization state from a-type to b-type. Then, the converted spectral components having polarization state of b-type reflected from the non-absorbing polarization color filter 86G. The reflected "red", "green", and "blue" spectral components ($\Delta\lambda_R$, $\Delta\lambda_G$ and $\Delta\lambda_B$) having polarization state of b-type are retransmitted through the polarization direction rotating element 5G changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of a-type (see arrow 25G in FIG. 7) is absorbed by front broadband sheet polarizer 70. On the other hand the ambient "white" light having polarization state of b-type (see arrow 35G in FIG. 7) is transmitted by front broadband sheet polarizer 70. Then, the part of light having the "green" spectral components is transmitted through the absorptive color filter 90G, whereas the part of light having the "red" or "blue" spectral components is absorbed by said color filter. Then the light having the "green" spectral components is transmitted through the non-absorbing polarization color filter 86G changing the polarization state from b-type to a-type. Whereupon the "green" spectral components (see arrow 45G) are transmitted through the polarization direction rotating element 5G changing the polarization state from a-type to b-type. Then, the rear broadband sheet polarizer 40 absorbs the converted <<red>> spectral components (see arrow 55G).

When "blue" subpixel 8B is driven into its "dark" state shown in FIG. 7, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5B changing the polarization state from a-type to b-type. Then, the converted spectral components having polarization state of b-type reflected from the non-absorbing polarization color filter 86B. The reflected "red", "green", and "blue" spectral components ($\Delta\lambda_R$, $\Delta\lambda_G$ and $\Delta\lambda_B$) having polarization state of b-type are retransmitted through the polarization direction rotating element 5B changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of a-type (see arrow 25B in FIG. 7) is absorbed by front broadband sheet polarizer 70. On the other hand the ambient "white" light having polarization state of b-type (see arrow 35B in FIG. 7) is transmitted by front broadband sheet polarizer 70. Then, the part of light having the "blue" spectral components is transmitted through the absorptive color filter 90B, whereas the part of light having the "green" or "red" spectral components is absorbed by said color filter. Then the light having the "blue" spectral components is transmitted through the non-absorbing polarization color filter 86B changing the polarization state from b-type to a-type. Whereupon the "blue" spectral components (see arrow 45B) are transmitted through the polarization direction rotating element 5B changing the polarization state from a-type to b-type. Then, the rear broadband sheet polarizer 40 absorbs the converted <<red>> spectral components (see arrow 55B).

When a linear polarization rotating element is driven to the active state as shown in FIG. 8, the element transmits the spectral components independently of the wavelength without effecting a conversion in polarization state, producing a "bright" subpixel level in response to the active state into which the given element was driven.

When a "red" subpixel 8R is driven to the "bright" state as shown in FIG. 8, spectral components of the backlight radiation having wavelengths within the "red" band $\Delta\lambda_R$ and the polarization state of a-type are transmitted through the rear broadband multilayer lossless polarizer 4, the rear broadband sheet polarizer 40, the linear polarization direction rotating element 5R without changing the polarization state, the non-absorbing polarization color filter 86R changing the polarization from a-type to b-type, the "red" absorptive color filter 90R, and the front broadband sheet polarizer 70. In this state, spectral components of the backlight radiation having wavelengths within the "green" band $\Delta\lambda_G$ or "blue" band $\Delta\lambda_B$ and the polarization state of a-type are transmitted through the rear broadband multilayer lossless polarizer 4, the rear broadband sheet polarizer 40, the linear polarization direction rotating element 5R, reflected by the "red" non-absorbing polarization color filter 86R and retransmitted through the linear polarization direction rotating element 5R, the rear broadband sheet polarizer 40, and the rear broadband multilayer lossless polarizer 4 back to the backlight structure for recycling.

When a "green" subpixel 8G is driven to the "bright" state as shown in FIG. 8, spectral components of the backlight radiation having wavelengths within the "green" band $\Delta\lambda_G$ and the polarization state of a-type are transmitted through the rear broadband multilayer lossless polarizer 4, the rear broadband sheet polarizer 40, the linear polarization direction rotating element 5G without changing the polarization state, the non-absorbing polarization color filter 86G changing the polarization from a-type to b-type, the "green" absorptive color filter 90G, and the front broadband sheet polarizer 70. In this state, spectral components of the backlight radiation having wavelengths within the "red" band $\Delta\lambda_R$ or "blue" band $\Delta\lambda_B$ and the polarization state of a-type are transmitted through the rear broadband multilayer lossless polarizer 4, the rear broadband sheet polarizer 40, the linear polarization direction rotating element 5G, reflected by the "green" non-absorbing polarization color filter 86G and retransmitted through the linear polarization direction rotating element 5G, the rear broadband sheet polarizer 40, and the rear broadband multilayer lossless polarizer 4 back to the backlight structure for recycling.

When a "blue" subpixel 8B is driven to the "bright" state as shown in FIG. 8, spectral components of the backlight radiation having wavelengths within the "blue" band $\Delta\lambda_B$ and the polarization state of a-type are transmitted through the rear broadband multilayer lossless polarizer 4, the rear broadband sheet polarizer 40, the linear polarization direction rotating element 5B without changing the polarization state, the non-absorbing polarization color filter 86B changing the polarization from a-type to b-type, the "blue" absorptive color filter 90B, and the front broadband sheet polarizer 70. In this state, spectral components of the backlight radiation having wavelengths within the "green" band $\Delta\lambda_G$ or "red" band $\Delta\lambda_R$ and the polarization state of a-type are transmitted through the rear broadband multilayer lossless polarizer 4, the rear broadband sheet polarizer 40, the linear polarization direction rotating element 5B, reflected by the "blue" non-absorbing polarization color filter 86B and retransmitted through the linear polarization direction rotating element 5B, the rear broadband sheet polarizer 40, and the rear broadband multilayer lossless polarizer 4 back to the backlight structure for recycling.

Figure 9:
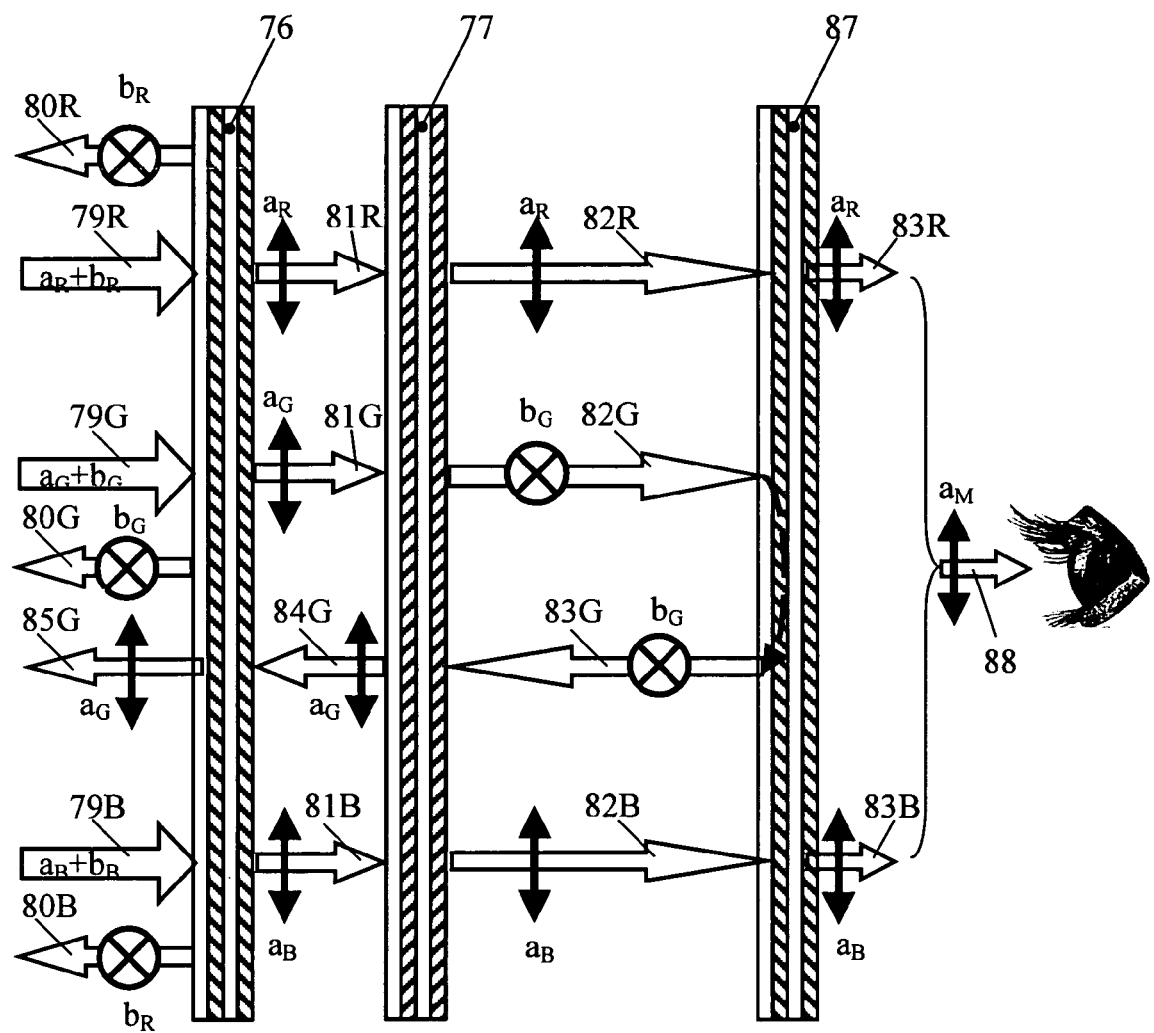
FIG. 9 is a schematic diagram of a non-absorbing polarization "magenta" color filter.

A "magenta" non-absorbing polarization color filter is schematically figured in FIG. 9. The non-absorbing polarization color filter comprises the Color Polarization Rotator (CPR) 77 located between a rear broadband multilayer lossless polarizer 76 and a front broadband multilayer lossless polarizer 87. In this embodiment of present invention shown in FIG. 9 the transmission axis AB of rear broadband multilayer lossless polarizer is parallel to the transmission axis of front broadband multilayer lossless polarizer and to the reference axis of the CPR. The following terms will be used in a further description. The polarization state of light having the electrical vector parallel with respect to transmission axis AB of rear broadband multilayer lossless polarizer is named as polarization state of a-type. On the other hand the polarization state of light having the perpendicular electrical vector with respect to transmission axis AB of rear broadband multilayer lossless polarizer is named as polarization state of b-type For incident unpolarized light 79R with spectral components having the wavelengths within the "red" band a part of the light having the polarization state of b-type 80R is reflected from the rear broadband multilayer lossless polarizer on the other hand an another part of the light having the polarization state of a-type 81R is transmitted through the rear broadband multilayer lossless polarizer. Then, the transmitted part of the light is transmitted through the CPR without changing the polarization state 82R and through the front broadband multilayer lossless polarizer with the same polarization state of a-type 83R.

The similar reasoning is fair for incident unpolarized light with spectral components having the wavelengths within the "blue" band 79B. A part of this light having the polarization state of b-type 80B is reflected from the rear broadband multilayer lossless polarizer and another part of the light having the polarization state of a-type 81B is transmitted through the rear broadband multilayer lossless polarizer. Then, the transmitted part of the light is transmitted through the CPR 77 without changing the polarization state 82B and through the front broadband multilayer lossless polarizer with the same polarization state of a-type 83B. Thus similarly to previous case, incident unpolarized "blue" light is transmitted by the "magenta" non-absorbing polarization color filter practically without losses.

In contrast to previous cases a part of incident unpolarized light with spectral components having the wavelengths within the "green" band is transmitted through the non-absorbing polarization color filter. The part of "green" light having the polarization state of b-type 80G is reflected from the rear broadband multilayer lossless polarizer and another part of "green" light having the polarization state of a-type 81G is transmitted through the rear broadband multilayer lossless polarizer. Whereupon transmitted spectral components 81G are transmitted through the CPR changing the polarization state from a-type to b-type 82G. Then said spectral components having the polarization state of b-type are reflected from the front broadband multilayer lossless polarizer (see arrow 83G). Whereupon the light is retransmitted through the CPR changing the polarization state from b-type to a-type 84G and retransmitted through the rear broadband multilayer lossless polarizer with the same polarization state of a-type 85G. Thus the part of unpolarized "green" light having the polarization state of a-type is reflected from the non-absorbing polarization color filter without changing the polarization state on the other hand another part of the light having the polarization state of b-type is reflected from the non-absorbing polarization color filter too.

The spectral components having wavelengths within the "red" band $\Delta\lambda_R$ and "blue" band $\Delta\lambda_B$ are mixed with each other at the output of non-absorbing polarization color filter and create the light of "cyan" color with the polarization state of a-type (see arrow 88).

In one embodiment shown in FIG. 9 the non-absorbing polarization filters are made of colorless birefringent crystal films only. Therefore the rear broadband multilayer lossless polarizer, front broadband multilayer lossless polarizer and CPR transmit or reflect the spectral components of light without energy loss or absorption.

Figure 10:
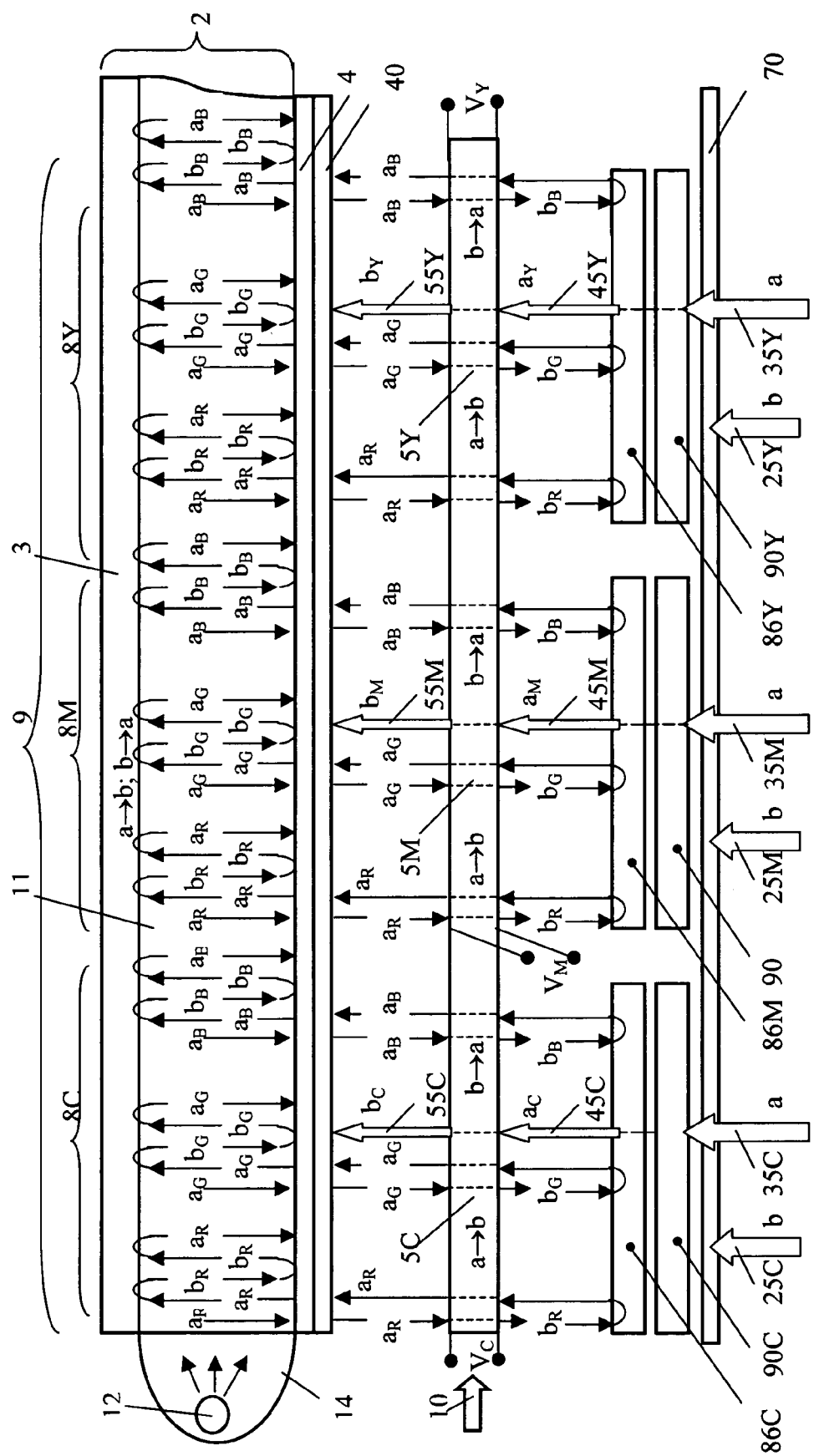
FIG. 10 is a schematic diagram of an expanded cross-sectional view of an exemplary pixel structure within the second particular embodiment of the LCD panel, wherein the spatial intensity modulation elements of the LCD panel are realized using linear polarization rotating elements, and the pixel driver signals provided thereto are selected to produce "dark" output levels at each of the CMY (cyan, magenta, yellow) subpixels of the exemplary pixel structure.
Figure 11:
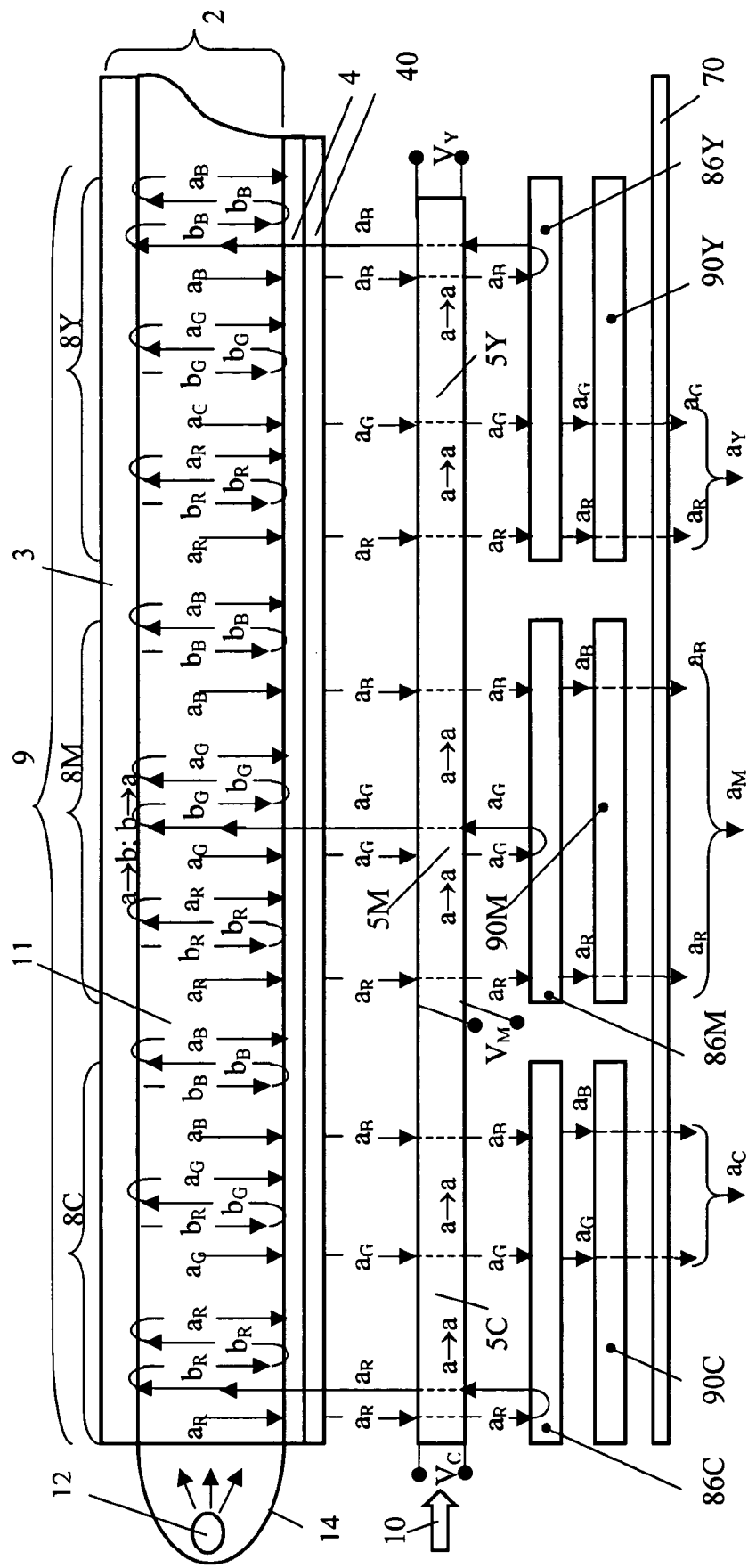
FIG. 11 is a schematic diagram of an expanded cross-sectional view of an exemplary pixel structure within the second particular embodiment of the LCD panel, wherein the spatial intensity modulation elements of the LCD panel are realized using linear polarization rotating elements, and the pixel driver signals provided thereto are selected to produce "bright" output levels at each of the CMY (cyan, magenta, yellow) subpixels of the exemplary pixel structure.

As is shown in FIGS. 10 and 11, unpolarized light produced within the backlight structure is composed of spectral components having both a-type and b-type polarization states. Only spectral components in polarization state of a-type are transmitted through the rear broadband multilayer lossless polarizer 4 adjacent to the backlight panel 2, whereas spectral components in polarization state of b-type incident thereon are reflected without energy loss or absorption. Spectral components reflected from rear broadband multilayer lossless polarizer 4 are incident onto the quasi-diffusive reflector 3 and undergo polarization inversion (from a-type to b-type and vice versa). This reflection process is independent of the wavelength. The spectral components having the polarization inverted from b-type to a-type are now transmitted through the rear broadband multilayer lossless polarizer 4. Then, the light transmitted the rear broadband multilayer lossless polarizer then incidents onto rear broadband sheet polarizer 40, where the light consisting of spectral components having wavelengths within visible band and polarization state of b-type is absorbed and the light consisting of spectral components having wavelengths within said visible band and said polarization state of a-type is transmitted.

When the linear polarization direction rotating elements 5C, 5M, and 5Y associated with "cyan", "magenta", and "yellow" subpixels (8C, 8M and 8Y) are driven into inactive state as shown in FIG. 10, the spectral components of transmitted light are modified due to the orthogonal conversion of polarization state (from a-type to b-type and vice versa) and a "dark" subpixel level is produced in response to the inactive state into which the given element was driven.

When "cyan" subpixel 8C is driven into its "dark" state shown in FIG. 10, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5C changing the polarization state from a-type to b-type. Then, the converted spectral components having polarization state of b-type reflected from the non-absorbing polarization color filter 86C. The reflected "red", "green", and "blue" spectral components ($\Delta\lambda_R$, $\Delta\lambda_G$ and $\Delta\lambda_B$) having polarization state of b-type are retransmitted through the polarization direction rotating element 5C changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of b-type (see arrow 25C in FIG. 10) is absorbed by front broadband sheet polarizer 70. On the other hand the ambient "white" light having polarization state of a-type (see arrow 35C in FIG. 10) is transmitted by front broadband sheet polarizer 70. Then, the part of light having the "cyan" spectral components is transmitted through the absorptive color filter 90C, whereas the part of light having the "red" spectral components is absorbed by said color filter. Then the light having the "cyan" spectral components is transmitted through the non-absorbing polarization color filter 86C without changing the polarization state. Whereupon the "cyan" spectral components (see arrow 45C) are transmitted through the polarization direction rotating element 5R changing the polarization state from a-type to b-type. Then, the rear broadband sheet polarizer 40 absorbs the converted "cyan" spectral components (see arrow 55C).

When "magenta" subpixel 8M is driven into its "dark" state shown in FIG. 10, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5M changing the polarization state from a-type to b-type. Then, the converted spectral components having polarization state of b-type reflected from the non-absorbing polarization color filter 86M. The reflected "red", "green", and "blue" spectral components ($\Delta\lambda_R$, $\Delta\lambda_G$ and $\Delta\lambda_B$) having polarization state of b-type are retransmitted through the polarization direction rotating element 5M changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of b-type (see arrow 25M in FIG. 10) is absorbed by front broadband sheet polarizer 70. On the other hand, the ambient "white" light having polarization state of a-type (see arrow 35M in FIG. 10) is transmitted by front broadband sheet polarizer 70. Then, the part of light having the "magenta" spectral components is transmitted through the absorptive color filter 90M, whereas the part of light having the "green" spectral components is absorbed by said color filter. Then the light having the "magenta" spectral components is transmitted through the non-absorbing polarization color filter 86M without changing the polarization state. Whereupon the "magenta" spectral components (see arrow 45M) are transmitted through the polarization direction rotating element 5M changing the polarization state from a-type to b-type. Then, the rear broadband sheet polarizer 40 absorbs the converted "magenta" spectral components (see arrow 55M).

When "yellow" subpixel 8Y is driven into its "dark" state shown in FIG. 10, spectral components of the backlight radiation having wavelengths within the "red", "green", and "blue" band ($\Delta\lambda_R$, $\Delta\lambda_G$ or $\Delta\lambda_B$) and the polarization state of a-type are transmitted through the rear broadband multilayer lossless polarizer 4 and rear broadband sheet polarizer 40. Whereupon said spectral components are transmitted through the polarization direction rotating element 5Y changing the polarization state from a-type to b-type. Then, the converted spectral components having polarization state of b-type reflected from the non-absorbing polarization color filter 86Y without absorption. The reflected "red", "green", and "blue" spectral components ($\Delta\lambda_R$, $\Delta\lambda_G$ or $\Delta\lambda_B$) having polarization state of b-type are retransmitted through the polarization direction rotating element 5Y changing the polarization from b-type to a-type. Finally, the converted spectral components having polarization state of a-type are transmitted through the rear broadband sheet polarizer 40 and the rear broadband multilayer lossless polarizer 4 back to the backlight structure for recycling. The ambient "white" light having polarization state of b-type (see arrow 25Y in FIG. 10) is absorbed by front broadband sheet polarizer 70. On the other hand the ambient "white" light having polarization state of a-type (see arrow 35Y in FIG. 10) is transmitted by front broadband sheet polarizer 70. Then, the part of light having the "yellow" spectral components is transmitted through the absorptive color filter 90Y, whereas the part of light having the "blue" spectral components is absorbed by said color filter. Then the light having the "yellow" spectral components is transmitted through the non-absorbing polarization color filter 86Y without changing the polarization state. Whereupon the "yellow" spectral components (see arrow 45Y) are transmitted through the polarization direction rotating element 5Y changing the polarization state from a-type to b-type. Then, the rear broadband sheet polarizer 40 absorbs the converted "yellow" spectral components (see arrow 55Y).

When a linear polarization rotating element is driven to the active state as shown in FIG. 11, the element transmits the spectral components independently of the wavelength without effecting a conversion in polarization state, producing a "bright" subpixel level in response to the active state into which the given element was driven.

When a "cyan" subpixel 8C is driven to the "bright" state as shown in FIG. 11, spectral components of the backlight radiation having wavelengths within the "green" band $\Delta\lambda_R$ or "blue" band $\Delta\lambda_B$ and the polarization state of a-type are transmitted through the rear broadband multilayer lossless polarizer 4, the rear broadband sheet polarizer 40, the linear polarization direction rotating element 5C without changing the polarization state, the non-absorbing polarization color filter 86C without changing the polarization, the "cyan" absorptive color filter 90C, and the front broadband sheet polarizer 70. In this state, spectral components of the backlight radiation having wavelengths within the "red" band $\Delta\lambda_R$ and the polarization state of a-type are transmitted through the rear broadband multilayer lossless polarizer 4, the rear broadband sheet polarizer 40, the linear polarization direction rotating element 5C, reflected by the "cyan" non-absorbing polarization color filter 86C and retransmitted through the linear polarization direction rotating element 5C, the rear broadband sheet polarizer 40, and the rear broadband multilayer lossless polarizer 4 back to the backlight structure for recycling.

When a "magenta" subpixel 8M is driven to the "bright" state as shown in FIG. 11, spectral components of the backlight radiation having wavelengths within the "red" band $\Delta\lambda_R$ or "blue" band AB and the polarization state of a-type are transmitted through the rear broadband multilayer lossless polarizer 4, the rear broadband sheet polarizer 40, the linear polarization direction rotating element 5M without changing the polarization state, the non-absorbing polarization color filter 86M without changing the polarization, the "magenta" absorptive color filter 90M, and the front broadband sheet polarizer 70. In this state, spectral components of the backlight radiation having wavelengths within the "green" band $\Delta\lambda_G$ and the polarization state of a-type are transmitted through the rear broadband multilayer lossless polarizer 4, the rear broadband sheet polarizer 40, the linear polarization direction rotating element 5M, reflected by the "magenta" non-absorbing polarization color filter 86M and retransmitted through the linear polarization direction rotating element 5M, the rear broadband sheet polarizer 40, and the rear broadband multilayer lossless polarizer 4 back to the backlight structure for recycling.

When a "yellow" subpixel 8Y is driven to the "bright" state as shown in FIG. 11, spectral components of the backlight radiation having wavelengths within the "red" band $\Delta\lambda_R$ or "green" band $\Delta\lambda_G$ and the polarization state of a-type are transmitted through the rear broadband multilayer lossless polarizer 4, the rear broadband sheet polarizer 40, the linear polarization direction rotating element 5Y without changing the polarization state, the non-absorbing polarization color filter 86Y without changing the polarization, the "yellow" absorptive color filter 90Y, and the front broadband sheet polarizer 70. In this state, spectral components of the backlight radiation having wavelengths within the "blue" band $\Delta\lambda_B$ and the polarization state of a-type are transmitted through the rear broadband multilayer lossless polarizer 4, the rear broadband sheet polarizer 40, the linear polarization direction rotating element 5Y, reflected by the "yellow" non-absorbing polarization color filter 86Y and retransmitted through the linear polarization direction rotating element 5Y, the rear broadband sheet polarizer 40, and the rear broadband multilayer lossless polarizer 4 back to the backlight structure for recycling.

DESCRIPTION OF EXEMPLARY EMBODIMENTS

One preferred embodiment of the disclosed invention is a non-absorbing polarization color filter comprising the following elements: a rear broadband multilayer lossless polarizer, a front broadband multilayer lossless polarizer, and a color polarization rotator. The rear broadband multilayer lossless polarizer has a predefined-oriented transmission axis AB. The front broadband multilayer lossless polarizer has a front surface and a rear surface facing the rear broadband multilayer lossless polarizer. Said front broadband multilayer lossless polarizer is located approximately in parallel with the rear broadband multilayer lossless polarizer, and has a transmission axis approximately parallel or approximately orthogonal with respect to transmission axis AB. The color polarization rotator is located between the front broadband multilayer lossless polarizer and the rear broadband multilayer lossless polarizer approximately in parallel with said polarizers. Said color polarization rotator comprises a stack of thin birefringent films with c-axes orientations alternated in sign according to a rocking angle $\alpha$ with respect to orientation of the transmission axis AB. A number, a rocking angle $\alpha$, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

In one variant of the disclosed invention the non-absorbing polarization color filter further comprises a transparent substrate. In this variant of invention the non-absorbing polarization color filter may comprise the following sequence of elements: the substrate, the rear broadband multilayer lossless polarizer, the color polarization rotator, and the front broadband multilayer lossless polarizer. In another embodiment of the non-absorbing polarization color filter said substrate is located between the rear broadband multilayer lossless polarizer and the color polarization rotator. In still another variant of the non-absorbing polarization color filter said substrate is located between the color polarization rotator and the front broadband multilayer lossless polarizer. In another variant of invention the non-absorbing polarization color filter comprises the following sequence of elements: the rear broadband multilayer lossless polarizer, the color polarization rotator, the front broadband multilayer lossless polarizer, and the substrate.

In one embodiment of the non-absorbing polarization color filter, the said rear broadband multilayer lossless polarizer comprises a stack of alternating layers of birefringent films and isotropic films. In another embodiment of the non-absorbing polarization color filter, at least one isotropic film comprises at least two layers made of materials having different indexes of refraction. In still another embodiment of the non-absorbing polarization color filter, said rear broadband multilayer lossless polarizer is broadband interference polarizer having number, thicknesses and optical anisotropies of thin birefringent films and isotropic films selected so that to provide an interferential extremum of a transmittance of light polarized approximately in parallel with respect to said transmission axis AB in broad band of visible light and of a reflectance of light polarized approximately orthogonally with respect to said transmission axis AB in broad band of visible light.

In one possible variant of the non-absorbing polarization color filter, said front broadband multilayer lossless polarizer comprises a stack of alternating layers of birefringent films and isotropic films. In another possible variant of the non-absorbing polarization color filter, at least one isotropic film comprises at least two layers made of materials having different indexes of refraction. In still another possible variant of the non-absorbing polarization color filter, said front broadband multilayer lossless polarizer is broadband interference polarizer having number, thicknesses and optical anisotropies of thin birefringent films and isotropic films selected so that to provide an interferential extremum of a transmittance of light polarized approximately in parallel with respect to said transmission axis AB in broad band of visible light and of a reflectance of light polarized approximately orthogonally with respect to said transmission axis AB in broad band of visible light.

In one variant of the disclosed invention, the non-absorbing polarization color filter further comprises at least one absorptive conventional color filter transmitting the predetermined color light and located on the front surface of front broadband multilayer lossless polarizer.

In another variant of the disclosed invention, the non-absorbing polarization color filter further comprises at least one front broadband sheet polarizer located on the absorptive color filter. Said sheet polarizer has a transmission axis approximately parallel to transmission axis of front broadband multilayer lossless polarizer.

At least one birefringent film may be made by means of Cascade Crystallization Process and characterized by a globally ordered biaxial crystalline structure with an inter-molecular spacing of 3.4±0.3 Å in the direction of one of optical axes. Said birefringent film is transparent in the wavelength band of visible light, and is formed by rodlike supramolecules which represent at least one polycyclic organic compound with a conjugated π-system and ionogenic groups.

In a possible variant of the disclosed non-absorbing polarization color filter, at least one transparent thin birefringent film has a fundamental absorption edge below 400 nm. In another possible variant of the disclosed non-absorbing polarization color filter, at least one transparent thin birefringent film has a transmission coefficient of not less than 0.98. In still another possible variant of the disclosed non-absorbing polarization color filter, at least one transparent thin birefringent film is uniformly transparent in the wavelength band of visible light.

In another embodiment, the present invention provides a non-absorbing polarization color filter, wherein at least one optically anisotropic layer is treated with ions of divalent and/or trivalent metals. In another non-absorbing polarization color filter, the molecules of at least one organic compound material contain heterocycles. In one variant of the disclosed invention, the non-absorbing polarization color filter contains at least one optically anisotropic layer made of a lyotropic liquid crystal based on at least one dichroic dye.

In another preferred embodiment, the present invention provides a liquid crystal display, comprising a liquid crystal cell, and a non-absorbing polarization color filter. The non-absorbing polarization color filter comprises the following elements: a rear broadband multilayer lossless polarizer, a front broadband multilayer lossless polarizer, and a color polarization rotator. The rear broadband multilayer lossless polarizer has a predefined-oriented transmission axis AB. The front broadband multilayer lossless polarizer has a front surface and a rear surface facing the rear broadband multilayer lossless polarizer. Said front broadband multilayer lossless polarizer is located approximately in parallel with the rear broadband multilayer lossless polarizer, and has a transmission axis approximately parallel or approximately orthogonal with respect to transmission axis AB. The color polarization rotator is located between the front broadband multilayer lossless polarizer and the rear broadband multilayer lossless polarizer approximately in parallel with said polarizers. Said color polarization rotator comprises a stack of thin birefringent films with c-axes orientations alternated in sign according to a rocking angle α with respect to orientation of the transmission axis AB. A number, a rocking angle α, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

What is claimed is:

1. A non-absorbing polarization color filter comprising the following elements:

a rear broadband multilayer lossless polarizer
having a predefined-oriented transmission axis AB;

a front broadband multilayer lossless polarizer
having a front surface and a rear surface facing the rear broadband multilayer lossless polarizer,
located approximately in parallel with the rear broadband multilayer lossless polarizer, and
having a transmission axis approximately parallel or approximately orthogonal with respect to transmission axis AB;

a color polarization rotator
located between the front broadband multilayer lossless polarizer and the rear broadband multilayer lossless polarizer approximately in parallel with said polarizers and
comprising a stack of thin birefringent films with c-axes orientations alternated in sign according to a rocking angle α with respect to orientation of the transmission axis AB, wherein a number, a rocking angle α, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

2. The non-absorbing polarization color filter according to claim 1, further comprising a transparent substrate.

3. The non-absorbing polarization color filter according to claim 2, comprising the following sequence of elements:
the substrate;
the rear broadband multilayer lossless polarizer;
the color polarization rotator;
the front broadband multilayer lossless polarizer.

4. The non-absorbing polarization color filter according to claim 2, wherein said substrate is located between the rear broadband multilayer lossless polarizer and the color polarization rotator.

5. The non-absorbing polarization color filter according to claim 2, wherein said substrate is located between the color polarization rotator and the front broadband multilayer lossless polarizer.

6. The non-absorbing polarization color filter according to claim 2, comprising the following sequence of elements:
the rear broadband multilayer lossless polarizer;
the color polarization rotator;
the front broadband multilayer lossless polarizer;
the substrate.

7. The non-absorbing polarization color filter according to claim 1, wherein said rear broadband multilayer lossless polarizer comprises a stack of alternating layers of birefringent films and isotropic films.

8. The non-absorbing polarization color filter according to claim 7, wherein at least one isotropic film comprises at least two layers made of materials having different indexes of refraction.

9. The non-absorbing polarization color filter according to claim 7, wherein said rear broadband multilayer lossless polarizer is broadband interference polarizer having number, thicknesses and optical anisotropies of thin birefringent films and isotropic films selected so that to provide an interferential extremum of a transmittance of light polarized approximately in parallel with respect to said transmission axis AB in broad band of visible light and of a reflectance of light polarized approximately orthogonally with respect to said transmission axis AB in broad band of visible light.

10. The non-absorbing polarization color filter according to claim 1, wherein said front broadband multilayer lossless polarizer comprises a stack of alternating layers of birefringent films and isotropic films.

11. The non-absorbing polarization color filter according to claim 10, wherein at least one isotropic film comprises at least two layers made of materials having different indexes of refraction.

12. The non-absorbing polarization color filter according to claim 10, wherein said front broadband multilayer lossless polarizer is broadband interference polarizer having number, thicknesses and optical anisotropies of thin birefringent films and isotropic films selected so that to provide an interferential extremum of a transmittance of light polarized approximately in parallel with respect to said transmission axis AB in broad band of visible light and of a reflectance of light polarized approximately orthogonally with respect to said transmission axis AB in broad band of visible light.

13. The non-absorbing polarization color filter according to claim 1, further comprising at least one absorptive conventional color filter transmitting the predetermined color light and located on the front surface of front broadband multilayer lossless polarizer.

14. The non-absorbing polarization color filter according to claim 13, further comprising at least one front broadband sheet polarizer located on the absorptive color filter, said sheet polarizer has a transmission axis approximately parallel to transmission axis of front broadband multilayer lossless polarizer.

15. The non-absorbing polarization color filter according to claim 1 wherein at least one birefringent film made by means of Cascade Crystallization Process and characterized by a globally ordered biaxial crystalline structure with an
intermolecular spacing of 3.4±0.3 Å in the direction of one of optical axes,
is transparent in the wavelength band of visible light, and
is formed by rodlike supramolecules which represent at least one polycyclic organic compound with a conjugated π-system and ionogenic groups.

16. The non-absorbing polarization color filter according to claim 15, wherein at least one transparent thin birefringent film has a fundamental absorption edge below 400 nm.

17. The non-absorbing polarization color filter according to claim 15, wherein at least one transparent thin birefringent film has a transmission coefficient of not less than 0.98.

18. The non-absorbing polarization color filter according to claim 15, wherein at least one transparent thin birefringent film is uniformly transparent in the wavelength band of visible light.

19. The non-absorbing polarization color filter according to claim 15, wherein at least one transparent thin birefringent film is treated with ions of divalent and/or trivalent metals.

20. The non-absorbing polarization color filter according to claim 15, wherein molecules of at least one organic compound material comprise heterocycles.

21. The non-absorbing polarization color filter according to claim 15, wherein at least one transparent thin birefringent film is made of a lyotropic liquid crystal based on at least one dichroic dye.

22. A liquid crystal display, comprising
a liquid crystal cell, and
a non-absorbing polarization color filter comprising the following elements:
a rear broadband multilayer lossless polarizer
having a predefined-oriented transmission axis AB;
a front broadband multilayer lossless polarizer
having a front surface and a rear surface facing the rear broadband multilayer lossless polarizer, located approximately in parallel with the rear broadband multilayer lossless polarizer,
and having a transmission axis approximately parallel or approximately orthogonal with respect to transmission axis AB;
a color polarization rotator
located between the front broadband multilayer lossless polarizer and the rear broadband multilayer lossless polarizer approximately in parallel with said polarizers and comprising a stack of thin birefringent films with c-axes orientations alternated in sign according to a rocking angle α with respect to orientation of the transmission axis AB, wherein a number, a rocking angle α, thicknesses and optical anisotropies of thin birefringent films are selected so, that the non-absorbing polarization color filter transmits a predetermined color light having the polarization state approximately parallel to transmission axis AB, reflects said predetermined color light having the polarization state orthogonal to the transmission axis AB, and reflects an unpolarized light of other predetermined color.

* * * * *